US012008075B2

(12) United States Patent
Watanabe et al.

(10) Patent No.: US 12,008,075 B2
(45) Date of Patent: Jun. 11, 2024

(54) TRAINING FEDERATED LEARNING MODELS

(71) Applicant: International Business Machines Corporation, Armonk, NY (US)

(72) Inventors: Shoichiro Watanabe, Tokyo (JP); Kenichi Takasaki, Tokyo (JP); Mari Abe Fukuda, Tokyo (JP); Sanehiro Furuichi, Tokyo (JP); Yasutaka Nishimura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 17/402,764

(22) Filed: Aug. 16, 2021

(65) Prior Publication Data

US 2023/0050708 A1 Feb. 16, 2023

(51) Int. Cl.
*G06F 18/214* (2023.01)
*G06F 17/18* (2006.01)
(Continued)

(52) U.S. Cl.
CPC .......... *G06F 18/2148* (2023.01); *G06F 17/18* (2013.01); *G06F 18/217* (2023.01); *G06N 3/08* (2013.01)

(58) Field of Classification Search
CPC .... G06F 18/2148; G06F 17/18; G06F 18/217; G06N 3/08; G06N 3/098
(Continued)

(56) References Cited

U.S. PATENT DOCUMENTS

2019/0138934 A1\* 5/2019 Prakash ................ G06F 9/5072
2019/0377984 A1 12/2019 Ghanta et al.
(Continued)

FOREIGN PATENT DOCUMENTS

WO 2019219846 A1 11/2019
WO 2021056043 A1 4/2021
WO 2021064737 A1 4/2021

OTHER PUBLICATIONS

Eunjeong Jeong, et al. "Communication-Efficient On-Device Machine Learning: Federated Distillation and Augmentation under Non-IID Private Data", https://arxiv.org/pdf/1811.11479.pdf, 32nd Conference on Neural Information Processing Systems (NIPS 2018), 2nd Workshop on Machine Learning on the Phone and other Consumer Devices (MLPCD 2), Montreal, Canada, Nov. 28, 2018, 6 pages.
(Continued)

*Primary Examiner* — Juan A Torres
(74) *Attorney, Agent, or Firm* — Edell, Shapiro & Finnan, LLC

(57) ABSTRACT

A computer system trains a federated learning model. A federated learning model is distributed to a plurality of computing nodes, each having a set of local training data comprising labeled data samples. Statistical data is received from each computing node that indicates the node's count of data samples for each label, and is analyzed to identify one or more computing nodes having local training data in which a label category is underrepresented beyond a threshold value with respect to data samples. Additional data samples labeled with the underrepresented labels are provided, and the computing nodes perform training. Results of training are received and are processed to generate a trained global model. Embodiments of the present invention further include a method and program product for training a feder-
(Continued)

ated learning model in substantially the same manner described above.

20 Claims, 8 Drawing Sheets

(51) Int. Cl.
  *G06F 18/21* (2023.01)
  *G06N 3/08* (2023.01)
(58) Field of Classification Search
  USPC .......................................................... 382/155
  See application file for complete search history.

(56) References Cited

U.S. PATENT DOCUMENTS

| | | | |
|---|---|---|---|
| 2021/0374502 A1* | 12/2021 | Roth | G06N 3/08 |
| 2022/0044114 A1* | 2/2022 | Sriram | G06N 3/082 |
| 2022/0101189 A1* | 3/2022 | Ben-Itzhak | G06F 21/6218 |
| 2022/0383091 A1* | 12/2022 | Das | H04L 69/04 |

OTHER PUBLICATIONS

Moming Duan, et al., "Astraea: Self-balancing Federated Learning for Improving Classification Accuracy of Mobile Deep Learning Applications", https://arxiv.org/abs/1907.01132, May 8, 2020, 9 pages.

"What is transfer learning?", https://www.tensorflow.org/js/tutorials/transfer/what_is_transfer_learning, Mar. 31, 2020, 1 page.

Timothy Yang, et al., "Applied Federated Learning: Improving Google Keyboard Query Suggestions", https://research.google/pubs/pub47655/, arXiv:1812.02903v1 [cs.LG], Dec. 7, 2018, 9 pages.

Peter Kairouz, et al., "Advances and Open Problems in Federated Learning", https://arxiv.org/pdf/1912.04977.pdf, arXiv:1912.04977v3 [cs.LG], Mar. 9, 2021, 121 pages.

Brendan McMahan, et al., "Federated Learning: Collaborative Machine Learning without Centralized Training Data", https://ai.googleblog.com/2017/04/federated-learning-collaborative.html, Google Al Blog, Apr. 6, 2017, 5 pages.

H. Brendan McMahan, et al., "Communication-Efficient Learning of Deep Networks from Decentralized Data", https://arxiv.org/pdf/1602.05629.pdf, Proceedings of the 20th International Conference on Artificial Intelligence and Statistics (AISTATS) 2017, Fort Lauderdale, Florida, USA. JMLR: W&CP vol. 54, arXiv:1602.05629v3 [cs.LG], Feb. 28, 2017, 11 pages.

Yue Zhao, et al., "Federated Learning with Non-IID Data", https://arxiv.org/pdf/1806.00582v1.pdf, arXiv:1806.00582v1 [cs.LG], Jun. 2, 2018, 13 pages.

(Explanatory article in Japanese), "Federated Learning: Federated Learning: Distributed learning technique using mobile device", https://www.school.ctc-g.co.jp/columns/nakai2/nakai269.html, downloaded from the internet on Apr. 26, 2021, 4 pages.

* cited by examiner

TRAINING FEDERATED LEARNING MODELS

BACKGROUND

1. Technical Field

Present invention embodiments relate to machine learning, and more specifically, to training techniques for improving the performance of federated learning models or other collaborative machine learning techniques.

2. Discussion of the Related Art

Federated learning, also known as collaborative learning, is a machine learning technique in which algorithms are trained across multiple decentralized computing nodes holding local data samples, without exchanging data between the computing nodes. This approach stands in contrast to traditional centralized machine learning techniques, in which a single computing device uses a training dataset to train a model, as well as to more classical decentralized approaches in which the local data samples are identically distributed.

Federated learning enables multiple entities to build a common, robust machine learning model without requiring the sharing of data between the decentralized computing devices, thereby addressing critical issues such as data privacy, data security, data access rights and access to heterogeneous data. Thus, federated learning may be particularly useful for applications that involve sensitive or confidential data, such as uses in industries like health care, pharmaceuticals, telecommunications, and Internet-of-Things.

SUMMARY

According to one embodiment of the present invention, a computer system trains a federated learning model. A federated learning model is distributed to a plurality of computing nodes, wherein each computing node includes a set of local training data for training the federated learning model comprising data samples each labeled with one label of a plurality of labels. Statistical data is received from each of the plurality of computing nodes, wherein the statistical data for a computing node is based on the local training data of the computing node, and wherein the statistical data indicates a count of data samples for each label. The statistical data is analyzed to identify one or more computing nodes having local training data in which a ratio of a count of data samples for one or more labels to a count of data samples for a most-represented label in the local training data is below a threshold value. Additional training data is provided to the identified one or more computing nodes, wherein the additional training data comprises data samples labeled with labels other than the most-represented label, and wherein the identified one or more computing nodes train the federated learning model using the set of local training data and the additional training data. Results from the plurality of computing nodes are received in response to the plurality of computing nodes each locally training the federated learning model, and the results are processed to generate a trained global model. Embodiments of the present invention further include a method and program product for training a federated learning model in substantially the same manner described above.

BRIEF DESCRIPTION OF THE DRAWINGS

Generally, like reference numerals in the various figures are utilized to designate like components.

DETAILED DESCRIPTION

Figure 1:
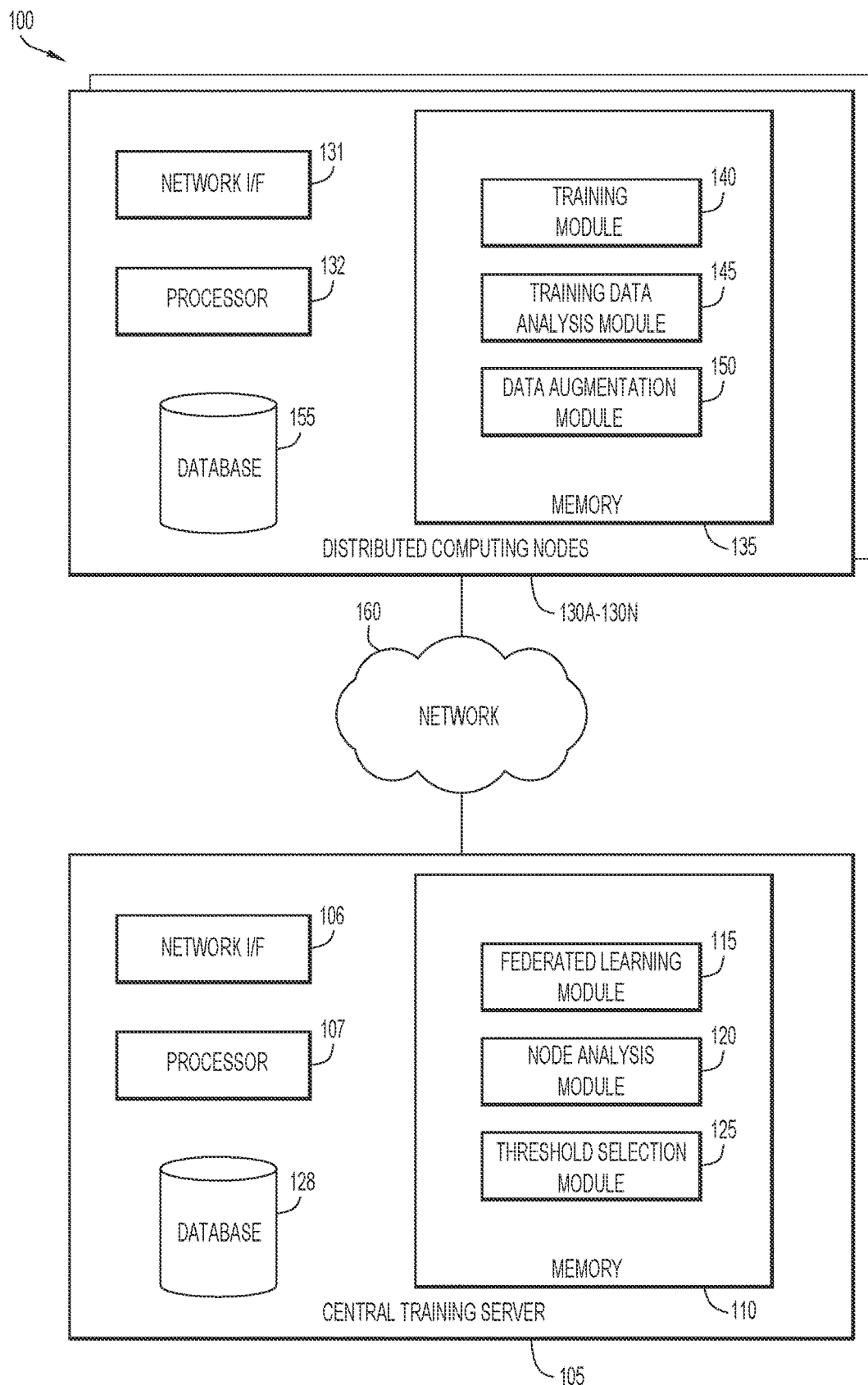
FIG. 1 is a block diagram depicting a computing environment for training a federated learning model in accordance with an embodiment of the present invention.

Present invention embodiments relate to machine learning, and more specifically, to training techniques for improving the performance of federated learning models or other collaborative machine learning techniques. Federated learning is a form of machine learning in which algorithms are distributed to multiple decentralized computing nodes, each of which performs training using a local set of training data. Once the training nodes complete their local training, the results can be combined at a central server to generate a global model that captures the learned patterns of its constituent locally-trained models.

One of the more difficult aspects of developing machine learning models is obtaining robust sets of training data. Federated learning approaches aim to address this issue, as training can be accomplished without requiring the individual training nodes to share their local sets of training data with the other training nodes or other entities. Thus, sensitive data can be safely used to contribute toward the training of a global model without compromising the privacy of the data. For example, the proprietary data of various participating individuals or organizations can be used to develop a federated learning model that can provide beneficial results to all of the participants without exposing any of the participants' sensitive data.

However, a federated learning model may have limited functionality if the federated learning model is trained using biased samples of training data. Bias, as used herein, refers to statistical bias; biased training data sets may therefore refer to any sets of data for which some types of samples are overrepresented or underrepresented with respect to other types of samples. Thus, labeled training data may be considered to be biased when the training data includes few, if any, data samples for a particular label category and/or an overrepresentation of data samples of a particular label category. For example, an image classifier that is trained to identify various types of animals would not be expected to be very accurate at identifying dogs if the classifier is trained using a set of training data that is biased such that it includes few, if any, sample images that depict dogs, and are labeled as such.

Accordingly, present invention embodiments identify any computing nodes participating in a federated learning task whose local training data sets may be biased to some degree, and mitigate or eliminate bias in order to improve the resulting global model. In particular, the relative counts of data samples of different labels can be compared to each other to identify labels that are overrepresented or underrepresented beyond a threshold amount, and additional data samples can be provided to provide a degree of balance to the local training data.

Thus, present invention embodiments improve the field of machine learning by reducing or eliminating bias during the training phase of federated learning and/or other collaborative learning models, thereby enabling global models to be developed that are more accurate than models produced by conventional techniques. Furthermore, present invention embodiments can augment local training data using techniques that do not require large amounts of data samples, thereby reducing the amount of manual labeling required for model development. Additionally, claimed embodiments can yield models that achieve a desired level of accuracy at a much faster rate, thereby reducing the amount of time and computing resources (e.g., processing resources, memory resources, and/or bandwidth resources) utilized during the machine learning process. Moreover, training can be performed more quickly, as mitigating the bias of training data enables convergence to be achieved in fewer training epochs, which also reduces the amount of time and computing resources required. Accordingly, present invention embodiments overcome problems specifically arising in the context of machine learning (e.g., the lack of access to robust training data sets in federated learning approaches) while also providing the practical application of increasing the accuracy of models (e.g., reducing the amount of erroneous classifications made by classifier models, etc.).

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for training a federated learning model in accordance with an embodiment of the present invention. As depicted, computing environment 100 includes a central training server 105, distributed computing nodes 130A-130N, and a network 160. It is to be understood that the functional division among components of computing environment 100 have been chosen for purposes of explaining present invention embodiments and is not to be construed as a limiting example.

Central training server 105 includes a network interface (I/F) 106, at least one processor 107, memory 110, and a database 128. Memory 110 may include a federated learning module 115, a node analysis module 120, and a threshold selection module 125. Central training server 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of central training server 105 to send and receive data over a network, such as network 160. In general, central training server 105 oversees federated learning tasks, analyzes distributed computing nodes to identify any nodes having biased local training data sets, and performs actions to substantially reduce or eliminate bias during training tasks. Central training server 105 may include internal and external hardware components, as depicted and described in further detail with respect to FIG. 7.

Federated learning module 115, node analysis module 120, and threshold selection module 125 may include one or more modules or units to perform various functions of present invention embodiments described below. Federated learning module 115, node analysis module 120, and threshold selection module 125 may be implemented by any combination of any quantity of software and/or hardware modules or units, and may reside within memory 110 of central training server 105 for execution by a processor, such as processor 107.

Federated learning module 115 may perform various functions associated with federated learning tasks, such as generating and distributing initial training algorithms to distributed computing nodes 130A-130N for training, combining results of the training process to generate trained global models, and other tasks, such as selecting particular computing nodes to participate in a training task, providing trained global models to destinations, and/or executing trained global models to respond to processing requests.

In some embodiments, federated learning module 115 initiates a federated learning task by providing copies of an algorithm that represents the pre-trained state of a federated learning model to any computing nodes that are participating in the federated learning task (e.g., distributed computing nodes 130A-130N). Federated learning module 115 may select initial values or settings for the pre-trained algorithm, such as providing random or other starting values to initialize the algorithm. In some embodiments, each distributed computing node 130A-130N receives an identical copy of the pre-trained algorithm, whereas in other embodiments, some variations may exist between the pre-trained algorithms that are distributed for a given federated learning task. The type of machine learning model that is implemented by the distributed pre-trained algorithms may vary depending on the federated learning task, and may include any form of machine learning that is suitable for training via any conventional or other federated learning approaches. For example, federated learning algorithms may utilize neural network-based machine learning techniques.

When a participating computing node receives the pre-trained algorithm, the computing node trains the algorithm using a local set of training data (which may be supplemented with additional training data in accordance with present invention embodiments), and once training is complete, the computing node provides the results back to central training server 105. Federated learning module 115 may combine the results from multiple computing nodes to generate a global trained model, which can be generated using any conventional or other federated learning techniques. In general, a global model may be generated based on parameters of the trained distributed models, such as the weights and biases of a trained distributed model's neural network; values for the global model can be obtained by averaging or otherwise combining corresponding values of multiple trained distributed models.

Node analysis module 120 receives or obtains statistical data from computing nodes participating in a federated learning task, and analyzes the data to identify any computing nodes whose local training data is biased beyond a threshold amount. In particular, node analysis module 120 identifies bias in local training data of distributed computing nodes 130A-130N when it is determined that some types of data samples are overrepresented or underrepresented with respect to other types of samples. When using labeled training data, e.g., for supervised or semi-supervised machine learning, the number of different types of labels may be known, and thus, various statistical techniques can be employed to identify whether a set of training data is biased in terms of its representation of all of the possible types of labels. For example, if an image classifier is being trained to recognize handwritten numerals, and a training data set contains few labeled data samples for the numeral "seven," compared to the number "five," then the training data set may be identified as biased by node analysis module 120.

Node analysis module 120 may analyze statistical data that describes the local training data of distributed computing nodes 130A-130N, rather than analyzing the training data itself. Thus, node analysis module 120 does not require access to the local training data itself, thereby addressing any privacy concerns regarding local training data. Instead, node analysis module 120 obtains, or is provided with, statistical data from distributed computing nodes 130A-130N that describes a count of data samples per label. For example, if a classifier is being trained to classify input into one of five categories, and each data sample is labeled with at most one label corresponding to the particular category that that data sample represents, then the statistical data associated with a distributed computing node may include a count of data samples for each of the five labels.

In some embodiments, node analysis module 120 identifies bias in local training data sets by comparing the count of data samples for an overrepresented label to the count of data samples for other labels. For example, one or more outliers may be identified corresponding to labels that have more samples as compared to other labels, and the counts of those one or more outlying labels can be compared to the counts of the other labels to determine whether the training data set is biased. In some embodiments, the label having the highest count of data samples may be selected, and compared with the counts of the other labels; if the ratio of counts of one or more of the other labels to the count of most-represented label does not surpass a threshold value, then the training data set may be considered to be biased. For example, if a label having a highest count of data samples has a count of one thousand samples, and the selected threshold value is 10%, then each of the other categories of labels must have at least one hundred data samples for the training set to not be deemed biased (because 10% of one thousand is one hundred).

In some embodiments, the threshold value utilized by node analysis module 120 for identifying biased sets of training data is a predetermined value. In some embodiments, the threshold value utilized by node analysis module 120 for identifying biased sets of training data is an experimentally-derived value that is based on one or more sets of training or testing data. When node analysis module 120 determines that a distributed computing node's local training data is biased, node analysis module 120 may provide additional data samples to the identified distributed computing node to balance the data. In particular, node analysis module 120 may provide a number of data samples of labels that are determined to be underrepresented such that the counts of data samples for those labels is sufficient to satisfy the threshold value criterion. In some embodiments, the additional training data includes augmented data that is automatically generated based on a small number of labeled data samples. Data augmentation can be performed by central training server 105 and/or by distributed computing nodes 130A-130N, and can produce a large volume of labeled training data using only a small set of manually labeled data. Data augmentation is depicted and described in further detail with respect to FIG. 4.

Threshold selection module 125 may determine a threshold value for node analysis module 120 to employ in the analysis of the statistical data that is obtained from distributed computing nodes 130A-130N. In particular, threshold selection module 125 may experimentally determine a threshold value by iteratively generating a biased set of training data, training a model on that data, testing the model, and gradually adding samples to the training data to reduce bias until a model is obtained that achieves a desired level of performance.

Threshold selection module 125 may initially generate a biased set of training data by including a disproportionate amount of data samples of one particular label compared to the other possible labels for a given machine learning task. In particular, threshold selection module 125 may create a biased set of training data that is exclusively, or almost exclusively, comprised of data samples of one particular label. This data sample may initially be used for a first iteration of testing, or a small amount of other data samples may also be included before performing a first iteration of testing. At each iteration, the set of training data is used to train a test model, whose accuracy is tested; additionally, at each iteration, the set of training data becomes less biased, as more data samples corresponding to the underrepresented labels are included in the training data. For example, a first iteration may include a test model that is trained using training data that includes one thousand data samples of one particular label and only ten data samples of each other label, and a second iteration may increase the size of the other labels to include twenty samples each, etc. In some embodiments, the number of data samples added to the underrepresented label categories may be similar or substantially similar at each iteration. In some embodiments, the number of data samples added to the underrepresented label categories may be a percentage of the count of data samples of the overrepresented label category. For example, at each iteration, threshold selection module may add an amount of data samples to each of the underrepresented categories that corresponds to one percent of the count of data samples for the overrepresented label category.

When a test model is trained using the training data at a given iteration, threshold selection module 125 tests the model. A trained model can be tested using any conventional or other machine learning model testing techniques that are relevant to a given model type or use-case. Threshold selection module 125 may test the model by comparing the result of one training iteration to one or more previous iterations to determine a level of improvement of the model. In some embodiments, a set of testing data, separate from the training data, is used to test a model after a training iteration, and the model can therefore be scored for accuracy from one iteration to another. In order to fairly compare models from one iteration to another, a same number of epochs may be used during the training phase at each iteration, and a same set of testing data may be used to test a model's accuracy at each iteration.

In some embodiments, when a trained model is tested using a set of test data, the results are analyzed using single regression analysis to determine an amount of bias for that particular model. Additionally or alternatively, the accuracy of the model may be obtained, which can be represented as a particular percentage of the number of data samples in the test data that the test model correctly classified. Threshold selection module 125 may select a threshold value corresponding to the ratio of the count of data samples for the one or more underrepresented data labels to the count of data samples for the overrepresented data label when the model's performance does not improve beyond a threshold amount for a number of iterations.

In some embodiments, threshold selection module 125 selects a threshold value when the amount of bias indicated by single regression analysis falls below a first metric and/or when the increase in a model's accuracy falls below a second metric for a number of iterations, such as three iterations. Then, threshold selection module 125 may retrospectively return to the particular iteration at which the bias began to remain below the first metric and/or the accuracy failed to improve beyond the second metric, and compute a threshold value by dividing the count of an underrepresented label's data samples to the count of the overrepresented label's data samples to obtain a percentage.

As an example, in one embodiment, the threshold value is selected if, after three iterations in a row, the amount of bias indicated by single regression analysis continues to fall below a first metric and the increase in a model's accuracy continues to fall below a second metric. Threshold selection module 125 may determine that this condition has been met at iteration i+2, and in response, will go back to iteration i, determine a count of data samples (e.g., 300 samples) for one of the data labels that is not the overrepresented data label, and divide the count by the count of data samples (e.g., 1000) corresponding to the overrepresented data label to obtain a threshold value (e.g., 300/1000 or 30%). The threshold value may then be shared with node analysis module 120 to identify nodes having local testing data considered to be sufficiently biased in accordance with present invention embodiments.

Database 128 may include any non-volatile storage media known in the art. For example, database 128 can be implemented with a tape library, optical library, one or more independent hard disk drives, or multiple hard disk drives in a redundant array of independent disks (RAID). Similarly, data in database 128 may conform to any suitable storage architecture known in the art, such as a file, a relational database, an object-oriented database, and/or one or more tables. In some embodiments, database 128 may store data relating to pre-trained federated learning models, trained global models, additional training data for reducing the bias in local training data sets, augmented training data, and/or testing and training data for determining threshold values.

Distributed computing nodes 130A-130N each include a network interface (I/F) 131, at least one processor 132, memory 135, and a database 155. Memory 135 may include a training module 140, a training data analysis module 145, and a data augmentation module 150. Distributed computing nodes 130A-130N may each include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 131 enables components of distributed computing nodes 130A-130N to send and receive data over a network, such as network 160. In general, distributed computing nodes 130A-130N perform the local training aspects of a federated learning task in accordance with present invention embodiments. Distributed computing nodes 130A-130N may include internal and external hardware components, as depicted and described in further detail with respect to FIG. 7.

Training module 140, training data analysis module 145, and data augmentation module 150 may include one or more modules or units to perform various functions of present invention embodiments described below. Training module 140, training data analysis module 145, and data augmentation module 150 may be implemented by any combination of any quantity of software and/or hardware modules or units, and may reside within memory 135 of any of distributed computing nodes 130A-130N for execution by a processor, such as processor 132.

Training module 140 may receive a pre-trained algorithm corresponding to a federated learning task and may develop a trained model using a set of training data that is local to each distributed computing node 130A-130N. Training module 140 of each distributed computing node 130A-130N may receive pre-trained algorithms from a central source, such as federated learning module 115 of central training server 105. Training module 140 may also receive training instructions, such as a particular number of epochs to perform training, or other indicia that a training task is locally completed. Training module 140 may share the results of training, such as the weight values and bias values of a neural network, or other data corresponding to a trained model, with central training server 105 so that a global model may be developed. In some embodiments, training module 140 does not begin training until instructed by central training server 105, which may not transmit the instruction to a particular distributed computing node to begin training until node analysis module 120 can determine that the distributed computing node's local training data is not sufficiently biased (or the bias has been mitigated) in accordance with present invention embodiments.

Training data analysis module 145 may analyze the local training data of any of distributed computing nodes 130A-130N to calculate statistical data for each distributed training node 130A-130N. Training data analysis module 145 may determine the number of labels that exist in a set of training data, if the number of labels is not already known, and may compute a count of data samples in the local training data for each label. Thus, training data analysis module 145 may output statistical data that indicates an integer value (i.e., a count) for each label type or category in the local training. Additionally or alternatively, training data analysis module 145 may report statistical data in terms of the relative proportions of samples for each category of label.

Data augmentation module 150 may perform data augmentation operations in order to increase the amount of local training data that is available for one or more label categories. In particular, data augmentation module 150 can employ conventional or other data augmentation techniques to produce new labeled training data based on an input of labeled training data. Data augmentation module 150 may generate new training data based on additional training data that is provided by central training server 105, and/or based on existing local training data.

In some embodiments, data augmentation module 150 generates augmented training data by averaging or interpolating data obtained from two or more samples of a particular label; the resulting data may be labeled with the same label. In embodiments in which data samples include images, data augmentation module 150 may apply conventional or other image processing operations to an input image to generate a new image that receives the same label as the input image. The image processing operations performed by data augmentation module 150 may include a horizontal or vertical flipping operation, a horizontal or vertical skewing operation, a rotation operation, a zoom-in or zoom-out operation, hiding a portion of an image, a brightness adjustment operation, or any combinations thereof. In some embodiments, multiple augmented data samples can be produced based on a single data sample (either obtained locally or provided as an additional data sample from central training server 105). For example, a single image may be rotated one degree at a time clockwise from one to ten degrees, and also counterclockwise from one to ten degrees, to produce twenty new augmented data samples.

Database 155 may include any non-volatile storage media known in the art. For example, database 155 can be implemented with a tape library, optical library, one or more independent hard disk drives, or multiple hard disk drives in a redundant array of independent disks (RAID). Similarly, data in database 155 may conform to any suitable storage architecture known in the art, such as a file, a relational database, an object-oriented database, and/or one or more tables. In some embodiments, database 155 may store data relating to pre-trained federated learning models, results of training models, local training data, additional training data that is received from central training server 105, augmented training data, statistical data generated by training data analysis module 145, and the like.

Network 160 may include a local area network (LAN), a wide area network (WAN) such as the Internet, or a combination of the two, and includes wired, wireless, or fiber optic connections. In general, network 160 can be any combination of connections and protocols known in the art that will support communications between central training server 105 and distributed computing nodes 130A-130N via their respective network interfaces in accordance with embodiments of the present invention.

Figure 2:
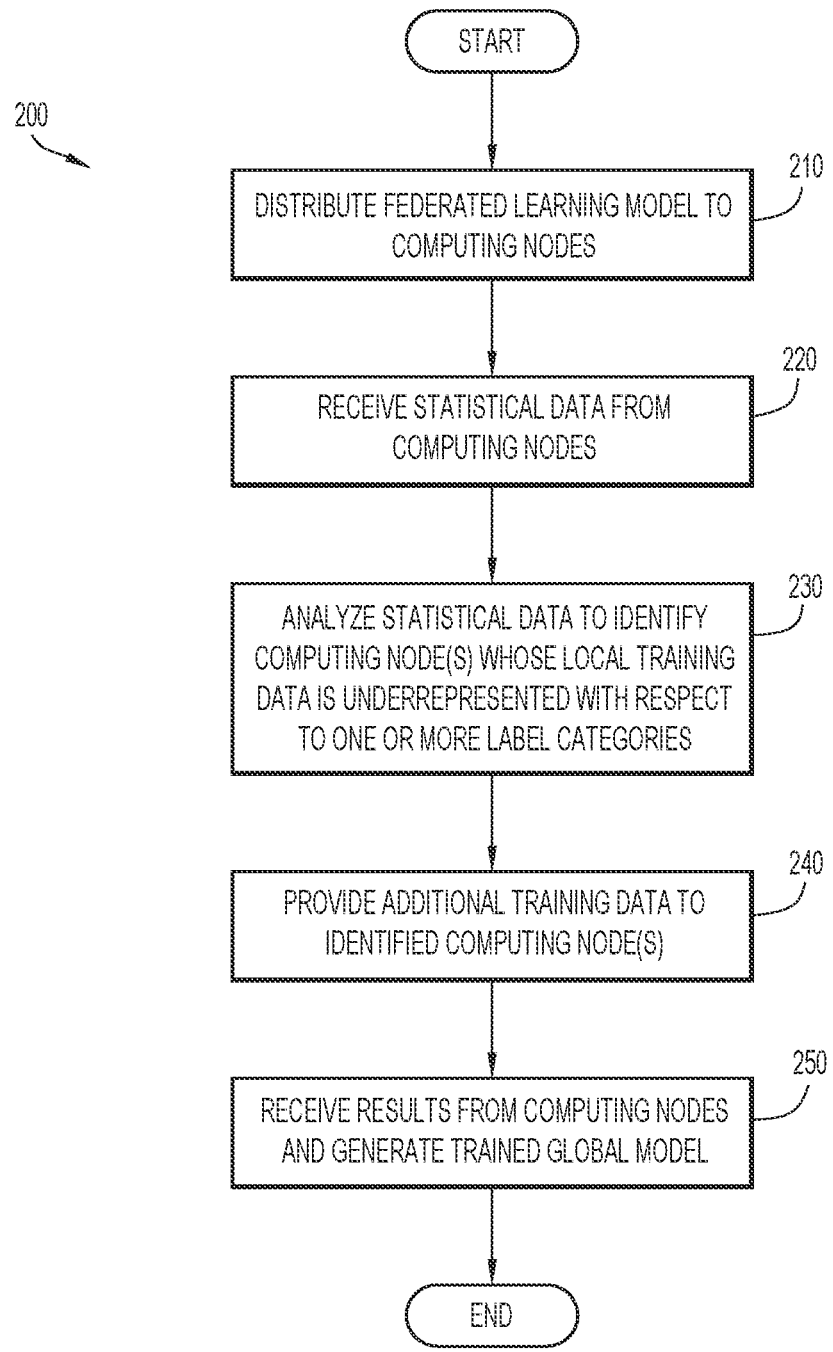
FIG. 2 is a flow chart depicting a method of training a federated learning model in accordance with an embodiment of the present invention.

FIG. 2 is a flow chart depicting a method 200 of training a federated learning model in accordance with an embodiment of the present invention.

A federated learning model is distributed to a plurality of computing nodes at operation 210. Copies of data that represents the pre-trained state of a federated learning model are distributed to nodes participating in a federated learning task. The nodes may each be associated with a different entity or organization, and as such, may each include a separate volume of data that can be used to locally train the distributed portion of a federated learning model while ensuring the data's privacy.

Statistical data is received from each of the computing nodes at operation 220. Each computing node of distributed computing nodes 130A-130N may compute statistical data based on its local training data; the statistical data may merely describe the number of data samples for each available category of label, and as such, may be described as metadata. The statistical data received by central training server 105 may indicate a source node (e.g., an identifier of the particular node of distributed computing nodes 130A-130N from which the statistical data is obtained), and a count of data samples per label category.

At operation 230, the statistical data is analyzed to identify any computing nodes whose local training data is underrepresented with respect to one or more label categories. Node analysis module 120 of central training server 105 may analyze the statistical data for each node to identify nodes whose local training data is underrepresented or overrepresented with respect to one or more label categories. In particular, a label category may be selected as having the highest count of data samples, and a ratio may be computed by dividing the counts of data samples of each of the other label categories by the count of the label category with the highest count of data samples. The ratios can be compared to a threshold value to determine if any label categories are underrepresented, and the corresponding distributed computing node may be thus identified.

Additional training data is provided to the identified computing nodes at operation 240. For each identified computing node, training data is provided by central training server 105 that includes data samples labeled with the labels determined to be underrepresented. In some embodiments, a number of data samples is provided to each identified computing node that is sufficient to ensure that the threshold value is met with respect to the ratio of data samples for the one or more categories of labels to the count of data samples of the overrepresented label category. In some embodiments, central training server 105 provides fewer additional data samples, and the identified computing nodes perform data augmentation to produce additional data samples sufficient to satisfy the criterion of the threshold value.

The results of training are received from the computing nodes and a trained global model is generated at operation 250. The results of training the distributed model, such as the weight values and bias values of a neural network, may be received by central training server 105. Thus, no local training data may necessarily by shared by distributed computing nodes 130A-130N, as central training server 105 may develop a global model in accordance with present invention embodiments using only the statistical data and the results of training the distributed model. The trained global model may be produced by combining the results of training received by distributed computing nodes 130A-103N according to any conventional or other federated learning techniques. The trained global model may be stored in database 128 of central training server 105, and/or central training server 105 may process requests using the trained global model (e.g., requests to classify data, etc.).

Figure 3A:
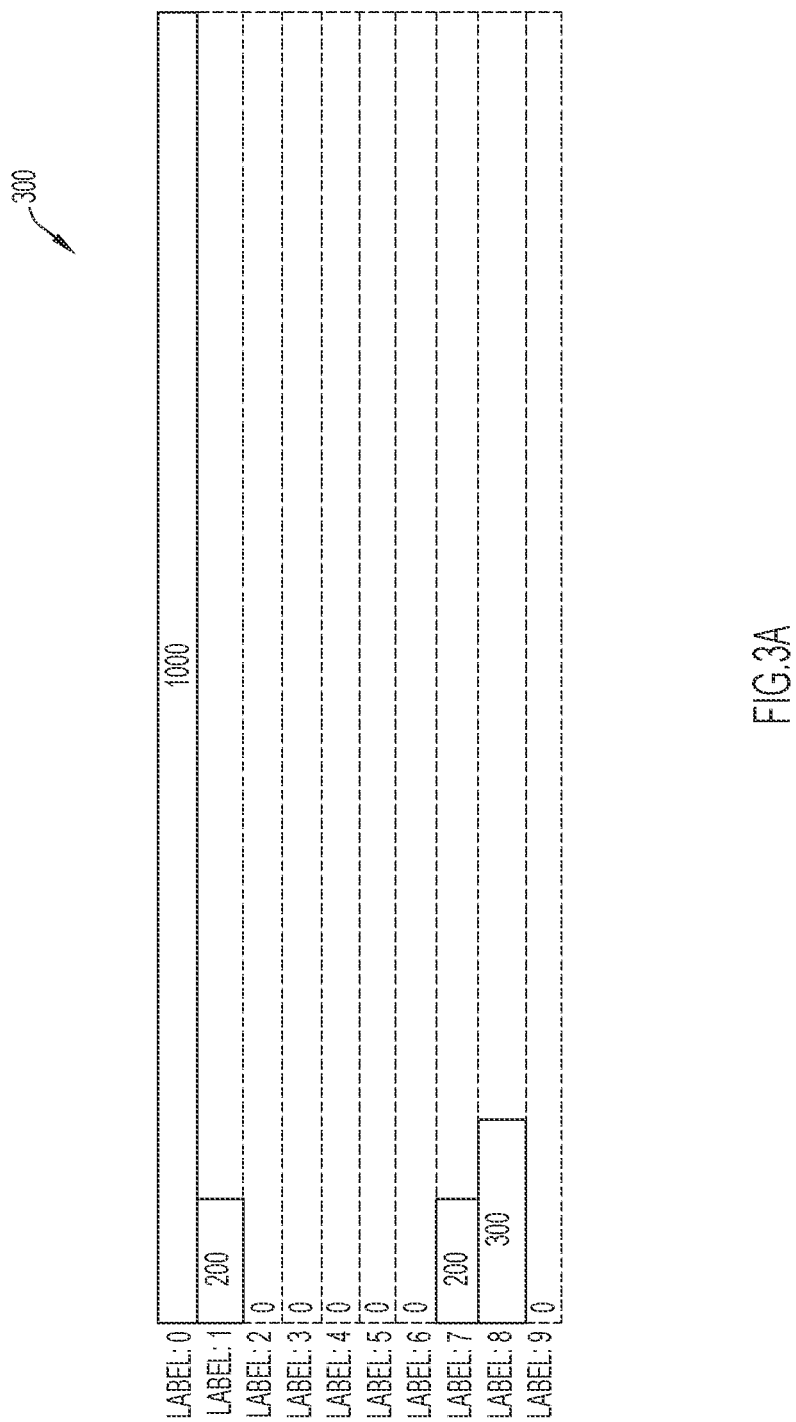
FIGS. 3A and 3B are bar graphs depicting distributions of training data by label in accordance with an embodiment of the present invention.
Figure 3B:
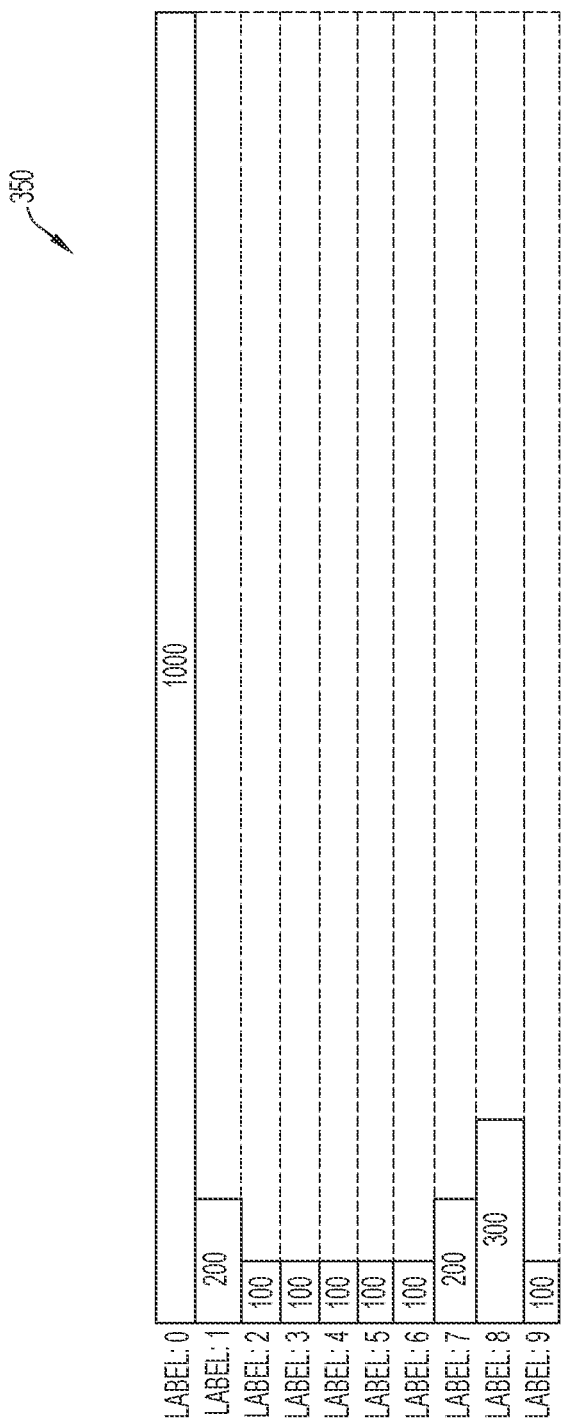

FIGS. 3A and 3B are bar graphs 300 and 350 depicting distributions of training data by label in accordance with an embodiment of the present invention. As depicted, bar graph 300 of FIG. 3A may illustrate a count of data samples by label category for a particular local training data set that is considered to be biased, or underrepresented with respect to certain data label categories, in accordance with an example embodiment, and bar graph 350 of FIG. 3B may illustrate a count of data samples corresponding to the embodiment of FIG. 3A after mitigation of bias in accordance with an example embodiment.

As shown in bar graph 300, a set of training data includes labels 0-9: there are 1,000 data samples with label 0, 200 data samples with label 1, 200 data samples with label 7, 300 data samples with label 8, and no data samples for labels 2, 3, 4, 5, 6, or 9. In the depicted embodiment, the threshold value is 10%, and since the most-represented label category, label 0, includes 1,000 data samples, the training data depicted in bar graph 300 is considered to be underrepresented with respect to any label categories that contain fewer than 10% of 1,000 data samples, or 100 data samples. Accordingly, as shown in bar graph 350, 100 data samples have been provided for each of label categories 2, 3, 4, 5, 6, and 9, thereby mitigating the bias of the training data in accordance with present invention embodiments.

Figure 4:
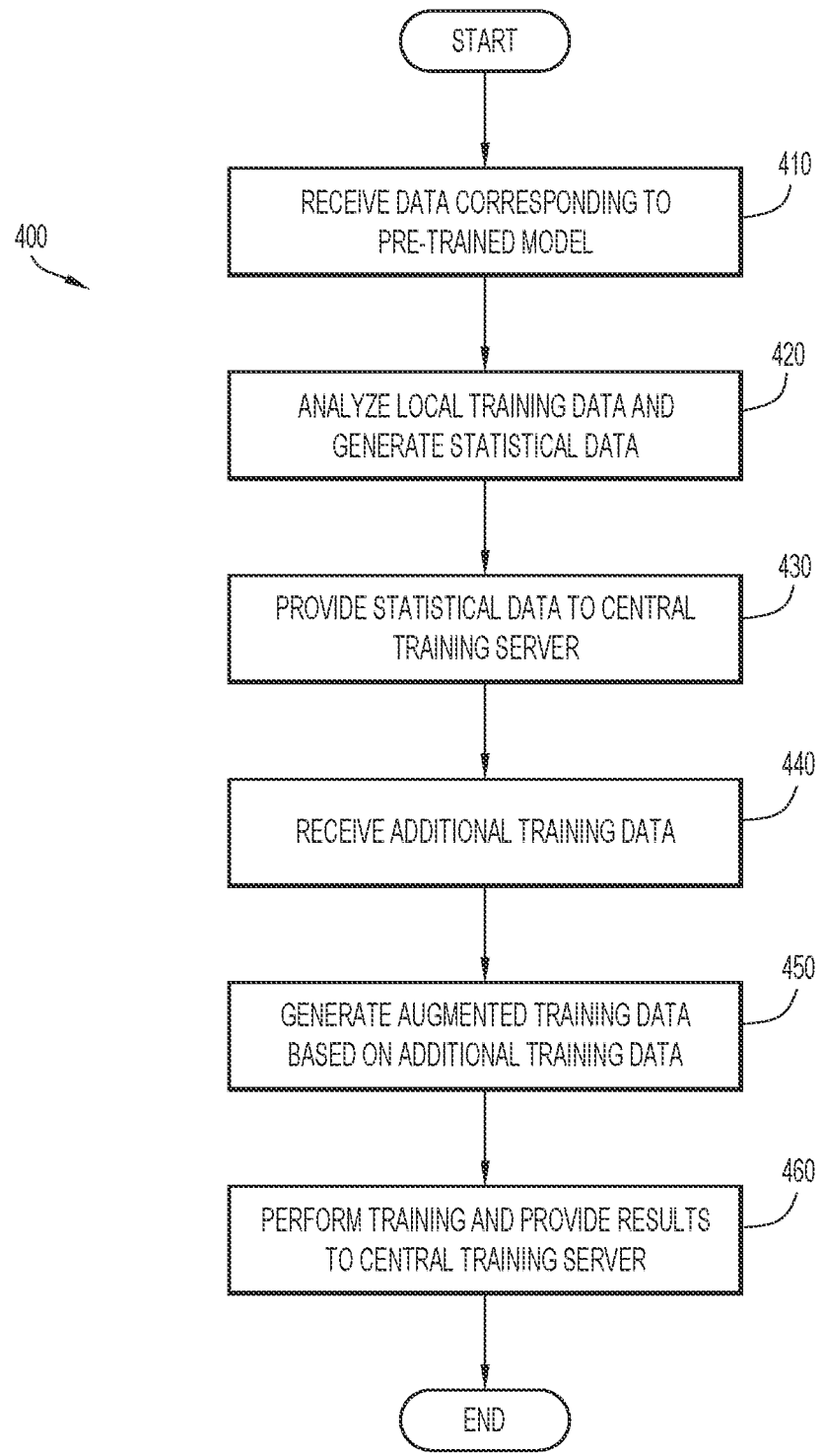
FIG. 4 is a flow chart depicting a method of local model training in accordance with an embodiment of the present invention.

FIG. 4 is a flow chart depicting a method 400 of local model training in accordance with an embodiment of the present invention.

Data corresponding to a pre-trained federated learning model is received at operation 410. The data may be provided by central training server 105 and received by each distributed computing nodes 130A-103N that is participating in a federated learning task.

The local training data is analyzed at operation 420 to generate statistical data. Each distributed computing node 130A-130N gathers or is provided with local training data, if not already present, and analyzes the data using training data analysis module 145 to calculate statistical data that includes the count of each data sample by label type. The statistical data is then provided to central training server 105 at operation 430.

Additional training data is received at operation 440. In response to the central training server 105 determining that one or more label categories of a local training data set are insufficient with respect to the count of data samples, additional training data may be received by a distributed computing node to overcome those identified insufficiencies. However, if a distributed computing node's local training data is deemed sufficiently representative in accordance with present invention embodiments, then no additional training data may be received; instead, the computing node may simply receive instructions to begin training.

Augmented training data is generated based on the additional training data at operation 450. In some embodiments, the additional training data received at operation 440 may not include a number of data samples that is sufficient to mitigate bias in the local training data, and so a distributed computing node performs data augmentation to generate even more data samples for local model training. Data augmentation can include, for image data, image processing techniques that slightly modify images to generate new images that can include the labels of the images upon which they are based. For other data types, data augmentation may include generating data based on multiple data samples of a same data label type, such as averaging some of the data values, and the like.

Training is performed and the results are provided to the central training server at operation 460. When a distributed computing node has been instructed to proceed with training, receives additional training data, and/or generates augmented training data, distributed node performs training according to any desired conventional or other machine learning technique, and provides the results to central training server 105.

Figure 5:
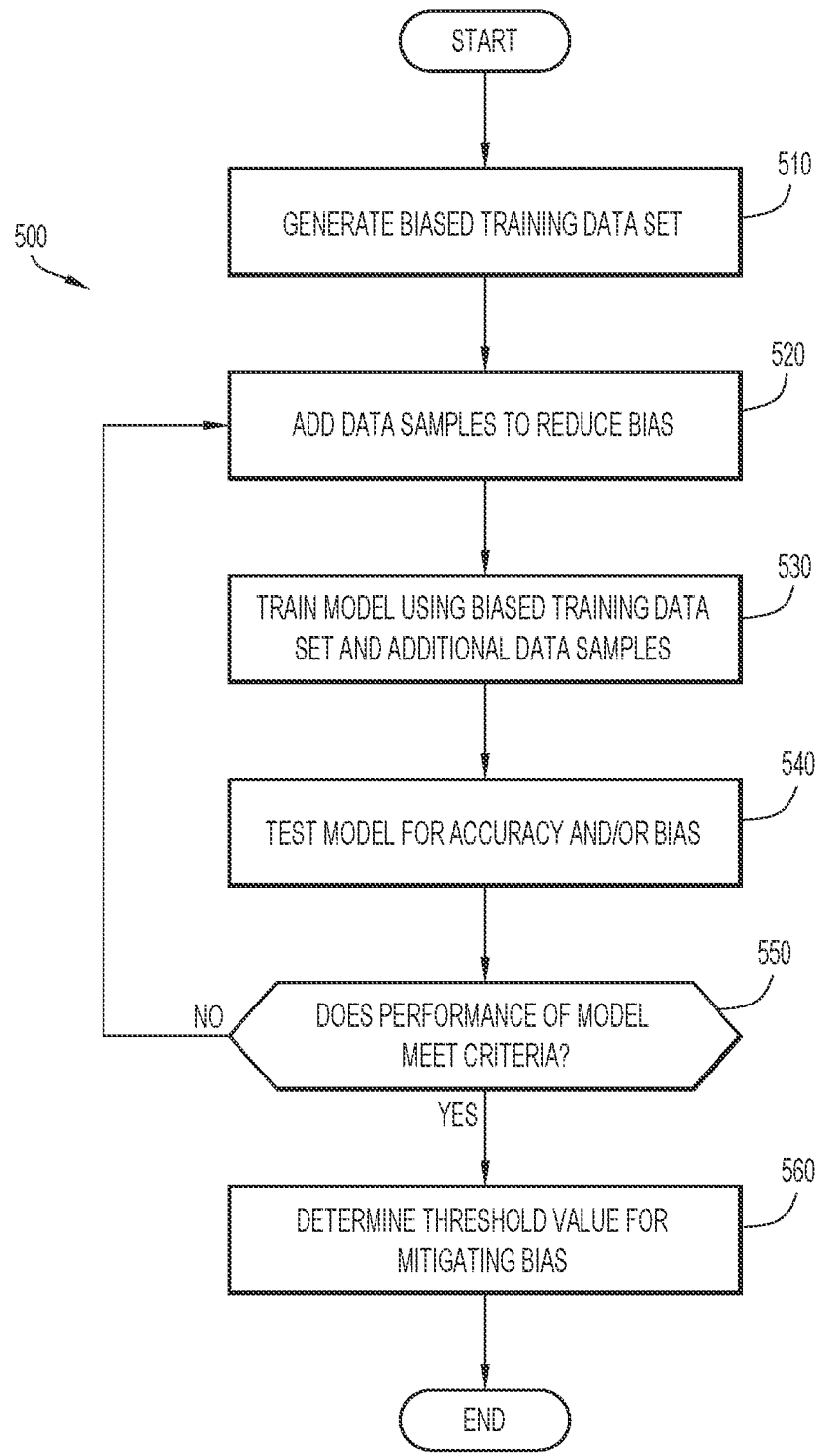
FIG. 5 is a flow chart depicting a method of determining a threshold value for mitigating bias in training data in accordance with an embodiment of the present invention.

FIG. 5 is a flow chart depicting a method 500 of determining a threshold value for mitigating bias in training data in accordance with an embodiment of the present invention.

A biased training data set is generated at operation 510. The training data set may be obtained from a larger data set that is representative of data for a particular task, such as data samples that can be used by central training server 105 to mitigate bias in local training data of distributed computing nodes 130A-130N. Initially, the biased training data set may include a count of data samples of one particular label category and few, if any, data samples of other categories. For example, a biased training data set may include 1,000 data samples of one label category, and zero data samples of any of nine other label categories.

Data samples are added to reduce bias at operation 520. Data samples corresponding to the other label categories may be added, which reduces bias in the data sample as the overrepresented label category becomes less of an outlier as more data samples of other label categories are included in the data set.

A model is trained using the biased training data set and the additional data samples at operation 530. The model may be trained a predetermined number of epochs using the biased training data set, or may be trained until some other training criterion is met, such as a loss value being below a threshold amount for a number of epochs.

The resulting test model is tested for accuracy and/or bias at operation 540. The accuracy of the resulting test model can be tested using a set of testing data, or the bias can be determined based on single regression analysis. At operation 550, it is determined whether the performance of the model meets the criteria for identifying a threshold value. In particular, if the accuracy and/or bias of the test model fall within predetermined accuracy or bias values, then threshold value for mitigating bias may be determined. If not, then method 500 iterates, returning back to add additional data samples to the biased training data set (operation 520) that correspond to label categories other than the overrepresented label category, and a new test model is trained (operation 530) and tested (operation 540); a number of iterations may be required before yielding a test model that passes the criteria for obtaining a threshold value. At each iteration, a same amount of data samples may be added to the biased training; for example, one hundred data samples of each label category, other than that overrepresented label category, may be added to the biased training data at each iteration.

The threshold value for mitigating bias is determined at operation 560. When it is determined that the test model passes the criteria for obtaining a threshold value, the threshold value may be computed by dividing a count of the data samples for any of the categories other than the overrepresented label category by the count of data samples in the overrepresented label category. Thus, a percentage value may be obtained that can be used to define how node analysis module 120 identifies underrepresented label categories in local training data sets.

Figure 6A:
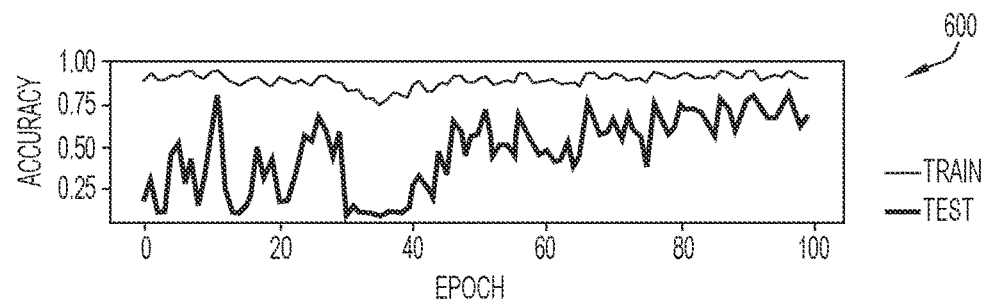
FIG. 6A is a line chart depicting accuracy of a model trained using training data that satisfies a first threshold value in accordance with an embodiment of the present invention.
Figure 6B:
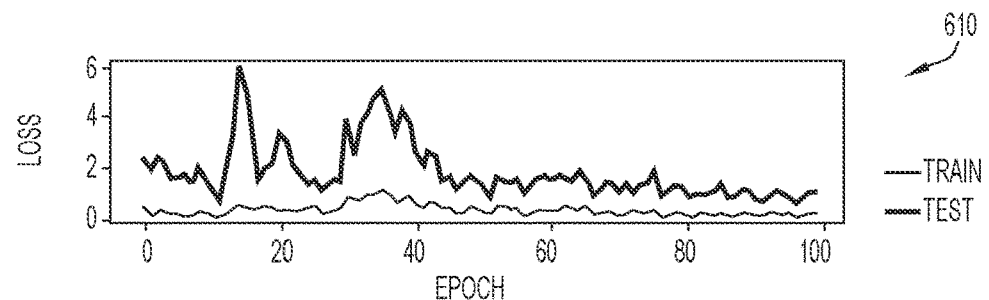
FIG. 6B is a line chart depicting loss for a model trained using training data that satisfies a first threshold value in accordance with an embodiment of the present invention.

FIG. 6A is a line chart 600 depicting accuracy of a model trained using training data that satisfies a first threshold value in accordance with an embodiment of the present invention. FIG. 6B is a line chart 610 depicting loss for a model trained using training data that satisfies a first threshold value in accordance with an embodiment of the present invention. As shown in line charts 600 and 610, a model is trained, and accuracy and loss values respectively are obtained on a per-epoch basis using the training and testing data. The embodiment from which the data of line charts 600 and 610 are obtained may correspond to a very low threshold value (e.g., 1%), meaning that trained models were produced using data for which the count of data samples for one or more label categories was only 1% of the count of the most-represented label category.

Figure 6C:
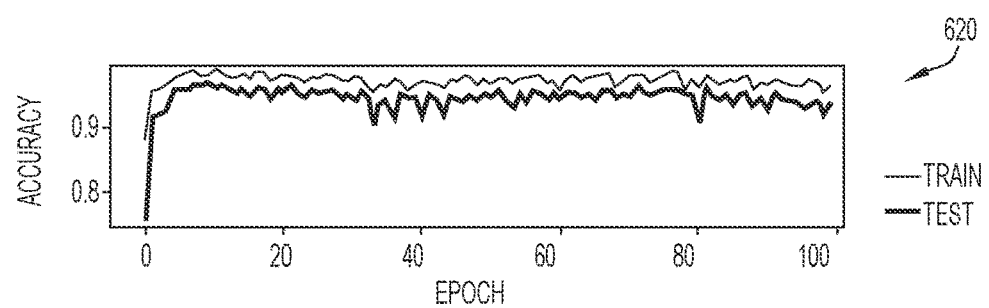
FIG. 6C is a line chart depicting accuracy of a model trained using training data that satisfies a second threshold value in accordance with an embodiment of the present invention.
Figure 6D:
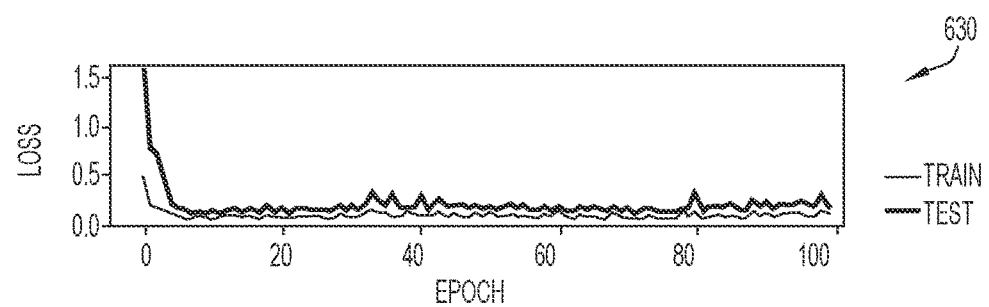
FIG. 6D is a line chart depicting loss for a model trained using training data that satisfies a second threshold value in accordance with an embodiment of the present invention.

FIG. 6C is a line chart 620 depicting accuracy of a model trained using training data that satisfies a second threshold value in accordance with an embodiment of the present invention. FIG. 6D is a line chart 630 depicting loss for a model trained using training data that satisfies a second threshold value in accordance with an embodiment of the present invention. In contrast to the embodiment depicted in FIGS. 6A and 6B, the embodiment depicted in FIGS. 6C and 6D has a higher threshold value, such as 10%, which is demonstrated in the relatively higher (e.g., in fewer epochs) convergence of model during training with respect to both accuracy and loss. In some embodiments, central training server 105 may generate visualizations for a range of threshold values that are similar to those of FIGS. 6A-6D, enabling a user to quickly identify the threshold value at which any further increase yields diminishing returns. Thus, a threshold value can be selected in a semi-manual manner, in addition to the experimental techniques disclosed herein. Alternatively, central training server 105 may automatically select a threshold value based on criteria pertaining to the accuracy, loss, and number of epochs for convergence. For example, a threshold may be selected where a further increase yields diminishing returns based on the accuracy, loss and number of epochs for convergence.

Figure 7:
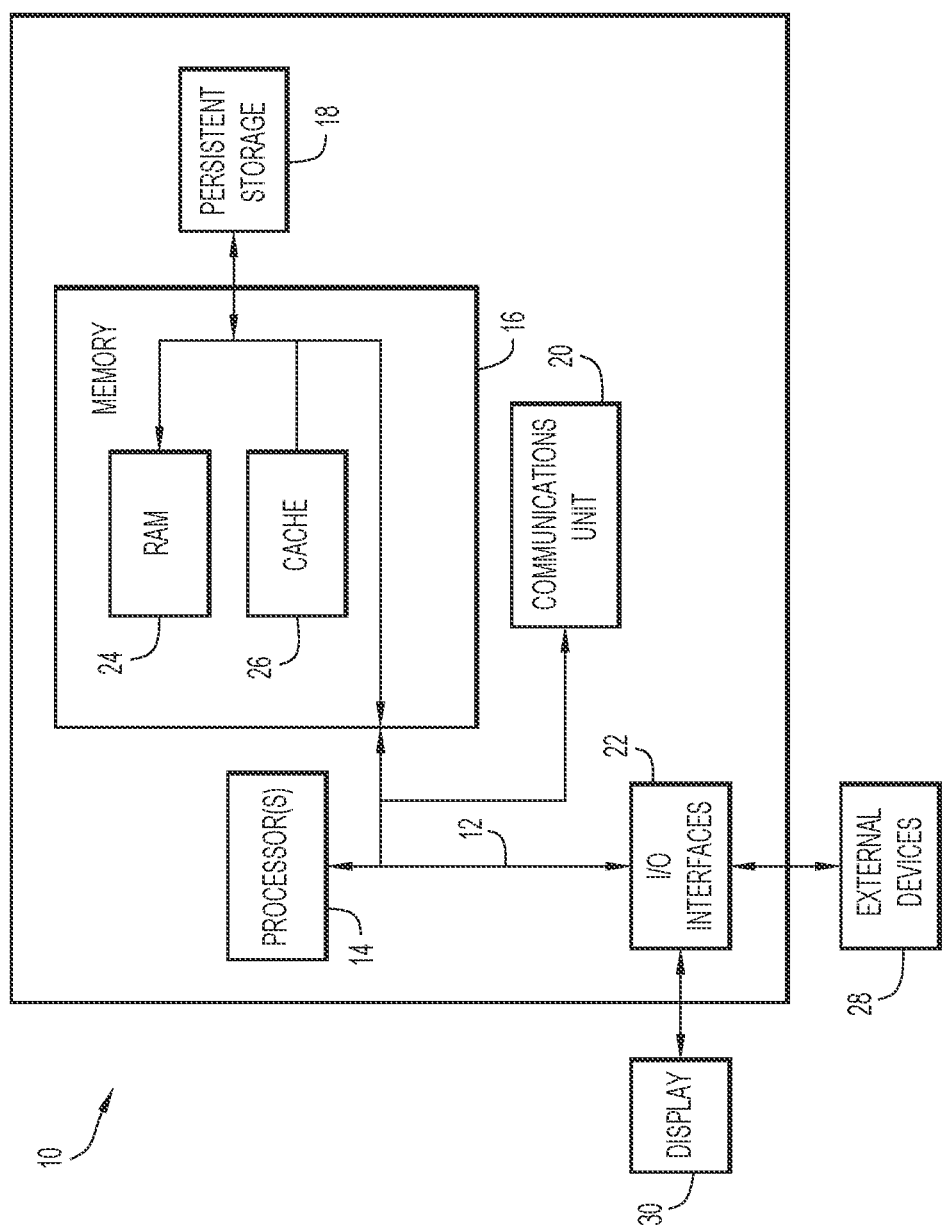
FIG. 7 is a block diagram depicting a computing device in accordance with an embodiment of the present invention.

FIG. 7 is a block diagram depicting components of a computer 10 suitable for executing the methods disclosed herein. Computer 10 may implement central training server 105 and/or distributed computing nodes 130A-130N in accordance with embodiments of the present invention. It should be appreciated that FIG. 7 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to training a federated learning model (e.g., pre-trained model data, local training data, statistical data, trained model results, experimental training and testing data, additional training data, augmented training data, trained global model data, etc.) may be stored within any conventional or other data structures (e.g., files, arrays, lists, stacks, queues, records, etc.) and may be stored in any desired storage unit (e.g., database, data or other repositories, queue, etc.). The data transmitted between central training server 105 and distributed computing nodes 130A-130N may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to training a federated learning model (e.g., pre-trained model data, local training data, statistical data, trained model results, experimental training and testing data, additional training data, augmented training data, trained global model data, etc.) may include any information provided to, or generated by, central training server 105 and/or any of distributed computing nodes 130A-130N. Data relating to training a federated learning model may include any desired format and arrangement, and may include any quantity of any types of fields of any size to store any desired data. The data relating to training a federated learning model may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to training a federated learning model), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of training federated learning models that have improved performance over conventional techniques.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, federated learning module 115, node analysis module 120, threshold selection module 125, training module 140, training data analysis module 145, data augmentation module 150, etc.). These systems may include any types of monitors and input devices (e.g., keyboard, mouse, voice recognition, etc.) to enter and/or view information.

It is to be understood that the software (e.g., communications software, server software, federated learning module 115, node analysis module 120, threshold selection module 125, training module 140, training data analysis module 145, data augmentation module 150, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, federated learning module 115, node analysis module 120, threshold selection module 125, training module 140, training data analysis module 145, data augmentation module 150, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to training a federated learning model). The database system may be implemented by any number of any conventional or other databases, data stores or storage structures (e.g., files, databases, data structures, data or other repositories, etc.) to store information (e.g., data relating to training a federated learning model). The database system may be included within or coupled to the server and/or client systems. The database systems and/or storage structures may be remote from or local to the computer or other processing systems, and may store any desired data (e.g., data relating to training a federated learning model).

The present invention embodiments may employ any number of any type of user interface (e.g., Graphical User Interface (GUI), command-line, prompt, etc.) for obtaining or providing information (e.g., data relating to training a federated learning model), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, improving the performance of any type of machine learning model trained using any type of distributed learning approaches.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for training a federated learning model, the method comprising:
   distributing a federated learning model to a plurality of computing nodes, wherein each computing node includes a set of local training data for training the federated learning model comprising data samples each labeled with one label of a plurality of labels;
   receiving statistical data from each of the plurality of computing nodes, wherein the statistical data for a computing node is based on the local training data of the computing node, and wherein the statistical data indicates a count of data samples for each label;
   analyzing the statistical data to identify one or more computing nodes having local training data in which a ratio of a count of data samples for one or more labels to a count of data samples for a most-represented label in the local training data is below a threshold value;
   providing additional training data to the identified one or more computing nodes, wherein the additional training data comprises data samples labeled with labels other than the most-represented label, and wherein the identified one or more computing nodes train the federated learning model using the set of local training data and the additional training data; and
   receiving results from the plurality of computing nodes in response to the plurality of computing nodes each locally training the federated learning model, and generating a trained global model based on the results.

2. The computer-implemented method of claim 1, wherein the threshold value is determined by:
   training a test model using a set of biased training data, wherein the biased training data initially comprises data samples of a selected label;
   iteratively adding substantially equal amounts of data samples representative of the plurality of labels other than the selected label to the set of biased training data, and training and testing the test model using a same set of testing data to determine an accuracy of the trained test model at each iteration; and
   in response to determining that the accuracy has not increased beyond a predetermined accuracy value for a number of iterations, selecting the threshold value based on a ratio of a count of the data samples of the selected label to a count of one or more of the data samples representative of the plurality of labels other than the selected label.

3. The computer-implemented method of claim 2, wherein the threshold value is selected for a particular iteration that is identified when the determined accuracy fails to increase by the predetermined accuracy value for two additional iterations beyond the particular iteration.

4. The computer-implemented method of claim 1, wherein the threshold value is determined by:
   training a test model using a set of biased training data, wherein the biased training data initially comprises data samples of a selected label;
   iteratively adding substantially equal amounts of data samples representative of the plurality of labels other than the selected label to the set of biased training data, and training and testing the test model using a same set of testing data to determine a bias of the trained test model at each iteration using single regression analysis; and
   in response to determining that the bias has not decreased beyond a predetermined bias value for a number of iterations, selecting the threshold value based on a ratio of a count of the data samples of the selected label to a count of one or more of the data samples representative of the plurality of labels other than the selected label.

5. The computer-implemented method of claim 1, wherein providing the additional training data further comprises providing augmented data based on the additional training data.

6. The computer-implemented method of claim 5, wherein the additional training data comprises labeled samples of images, and wherein the augmented data is generated based on the additional training data by performing one or more image processing operations on the labeled samples of images, the one or more image processing operations including: a horizontal or vertical flipping operation, a horizontal or vertical skewing operation, a rotation operation, a zoom-in or zoom-out operation, hiding a portion of an image, and a brightness adjustment operation.

7. The computer-implemented method of claim 5, wherein the augmented data is generated locally at the plurality of computing nodes.

8. A computer system for training a federated learning model, the computer system comprising:
   one or more computer processors;
   one or more computer readable storage media;
   program instructions stored on the one or more computer readable storage media for execution by at least one of the one or more computer processors, the program instructions comprising instructions to:
   distribute a federated learning model to a plurality of computing nodes, wherein each computing node includes a set of local training data for training the federated learning model comprising data samples each labeled with one label of a plurality of labels;
   receive statistical data from each of the plurality of computing nodes, wherein the statistical data for a computing node is based on the local training data of the computing node, and wherein the statistical data indicates a count of data samples for each label;

analyze the statistical data to identify one or more computing nodes having local training data in which a ratio of a count of data samples for one or more labels to a count of data samples for a most-represented label in the local training data is below a threshold value;

provide additional training data to the identified one or more computing nodes, wherein the additional training data comprises data samples labeled with labels other than the most-represented label, and wherein the identified one or more computing nodes train the federated learning model using the set of local training data and the additional training data; and receive results from the plurality of computing nodes in response to the plurality of computing nodes each locally training the federated learning model, and generating a trained global model based on the results.

9. The computer system of claim 8, wherein the threshold value is determined by:

training a test model using a set of biased training data, wherein the biased training data initially comprises data samples of a selected label;

iteratively adding substantially equal amounts of data samples representative of the plurality of labels other than the selected label to the set of biased training data, and training and testing the test model using a same set of testing data to determine an accuracy of the trained test model at each iteration; and in response to determining that the accuracy has not increased beyond a predetermined accuracy value for a number of iterations, selecting the threshold value based on a ratio of a count of the data samples of the selected label to a count of one or more of the data samples representative of the plurality of labels other than the selected label.

10. The computer system of claim 9, wherein the threshold value is selected for a particular iteration that is identified when the determined accuracy fails to increase by the predetermined accuracy value for two additional iterations beyond the particular iteration.

11. The computer system of claim 8, wherein the threshold value is determined by:

training a test model using a set of biased training data, wherein the biased training data initially comprises data samples of a selected label;

iteratively adding substantially equal amounts of data samples representative of the plurality of labels other than the selected label to the set of biased training data, and training and testing the test model using a same set of testing data to determine a bias of the trained test model at each iteration using single regression analysis; and in response to determining that the bias has not decreased beyond a predetermined bias value for a number of iterations, selecting the threshold value based on a ratio of a count of the data samples of the selected label to a count of one or more of the data samples representative of the plurality of labels other than the selected label.

12. The computer system of claim 8, wherein the program instructions to provide the additional training data further comprise instructions to provide augmented data based on the additional training data.

13. The computer system of claim 12, wherein the additional training data comprises labeled samples of images, and wherein the augmented data is generated based on the additional training data by performing one or more image processing operations on the labeled samples of images, the one or more image processing operations including: a horizontal or vertical flipping operation, a horizontal or vertical skewing operation, a rotation operation, a zoom-in or zoom-out operation, hiding a portion of an image, and a brightness adjustment operation.

14. The computer system of claim 12, wherein the augmented data is generated locally at the plurality of computing nodes.

15. A computer program product for training a federated learning model, the computer program product comprising one or more computer readable storage media collectively having program instructions embodied therewith, the program instructions executable by a computer to cause the computer to:

distribute a federated learning model to a plurality of computing nodes, wherein each computing node includes a set of local training data for training the federated learning model comprising data samples each labeled with one label of a plurality of labels;

receive statistical data from each of the plurality of computing nodes, wherein the statistical data for a computing node is based on the local training data of the computing node, and wherein the statistical data indicates a count of data samples for each label;

analyze the statistical data to identify one or more computing nodes having local training data in which a ratio of a count of data samples for one or more labels to a count of data samples for a most-represented label in the local training data is below a threshold value;

provide additional training data to the identified one or more computing nodes, wherein the additional training data comprises data samples labeled with labels other than the most-represented label, and wherein the identified one or more computing nodes train the federated learning model using the set of local training data and the additional training data; and receive results from the plurality of computing nodes in response to the plurality of computing nodes each locally training the federated learning model, and generating a trained global model based on the results.

16. The computer program product of claim 15, wherein the threshold value is determined by:

training a test model using a set of biased training data, wherein the biased training data initially comprises data samples of a selected label;

iteratively adding substantially equal amounts of data samples representative of the plurality of labels other than the selected label to the set of biased training data, and training and testing the test model using a same set of testing data to determine an accuracy of the trained test model at each iteration; and in response to determining that the accuracy has not increased beyond a predetermined accuracy value for a number of iterations, selecting the threshold value based on a ratio of a count of the data samples of the selected label to a count of one or more of the data samples representative of the plurality of labels other than the selected label.

17. The computer program product of claim 16, wherein the threshold value is selected for a particular iteration that is identified when the determined accuracy fails to increase by the predetermined accuracy value for two additional iterations beyond the particular iteration.

18. The computer program product of claim 15, wherein the threshold value is determined by:

training a test model using a set of biased training data, wherein the biased training data initially comprises data samples of a selected label;

iteratively adding substantially equal amounts of data samples representative of the plurality of labels other than the selected label to the set of biased training data, and training and testing the test model using a same set of testing data to determine a bias of the trained test model at each iteration using single regression analysis; and in response to determining that the bias has not decreased beyond a predetermined bias value for a number of iterations, selecting the threshold value based on a ratio of a count of the data samples of the selected label to a count of one or more of the data samples representative of the plurality of labels other than the selected label.

19. The computer program product of claim 15, wherein the program instructions to provide the additional training data further comprise instructions to provide augmented data based on the additional training data.

20. The computer system of claim 19, wherein the additional training data comprises labeled samples of images, and wherein the augmented data is generated based on the additional training data by performing one or more image processing operations on the labeled samples of images, the one or more image processing operations including: a horizontal or vertical flipping operation, a horizontal or vertical skewing operation, a rotation operation, a zoom-in or zoom-out operation, hiding a portion of an image, and a brightness adjustment operation.

* * * * *